Sept. 23, 1941.  A. H. HANNON  2,256,560
ELECTROPROCESSING MACHINE
Filed July 17, 1936  9 Sheets-Sheet 9
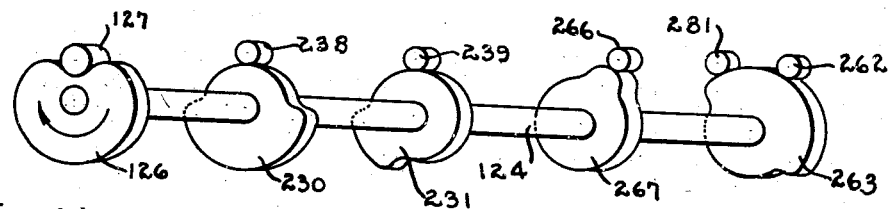
FIG. 13
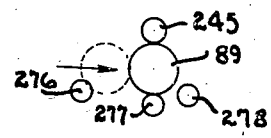
FIG. 14
FIG. 15
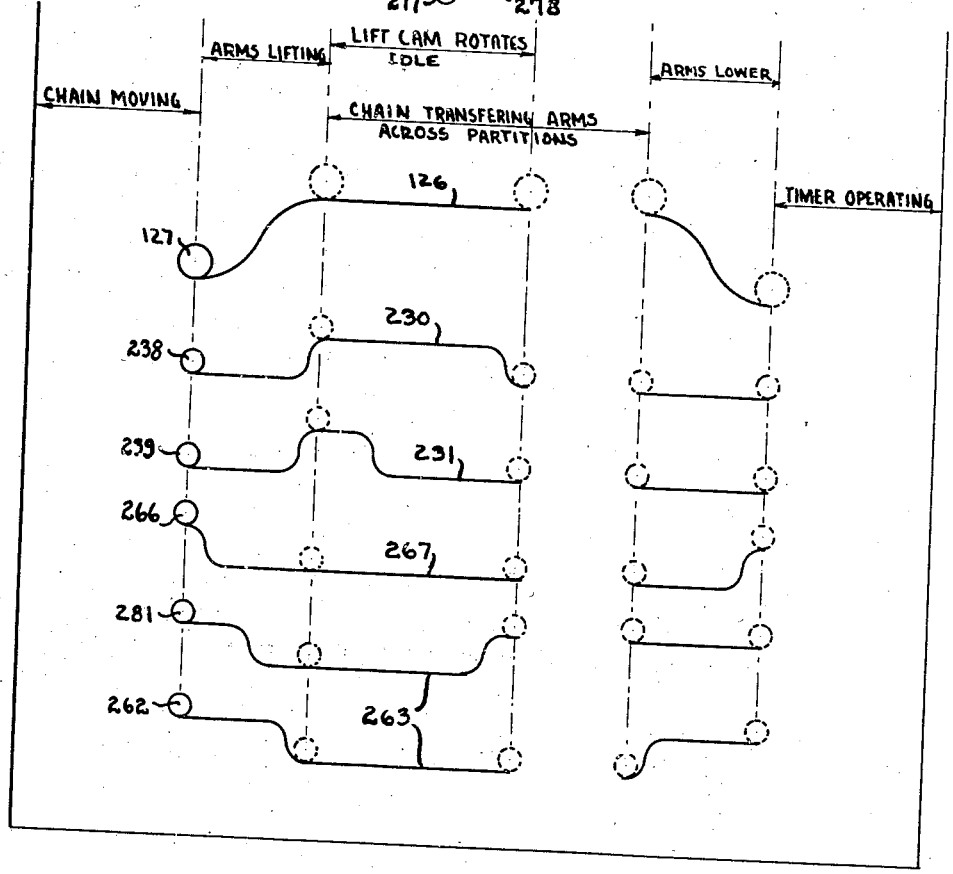
Inventor
ALBERT H. HANNON
By
Attorneys Patented Sept. 23, 1941

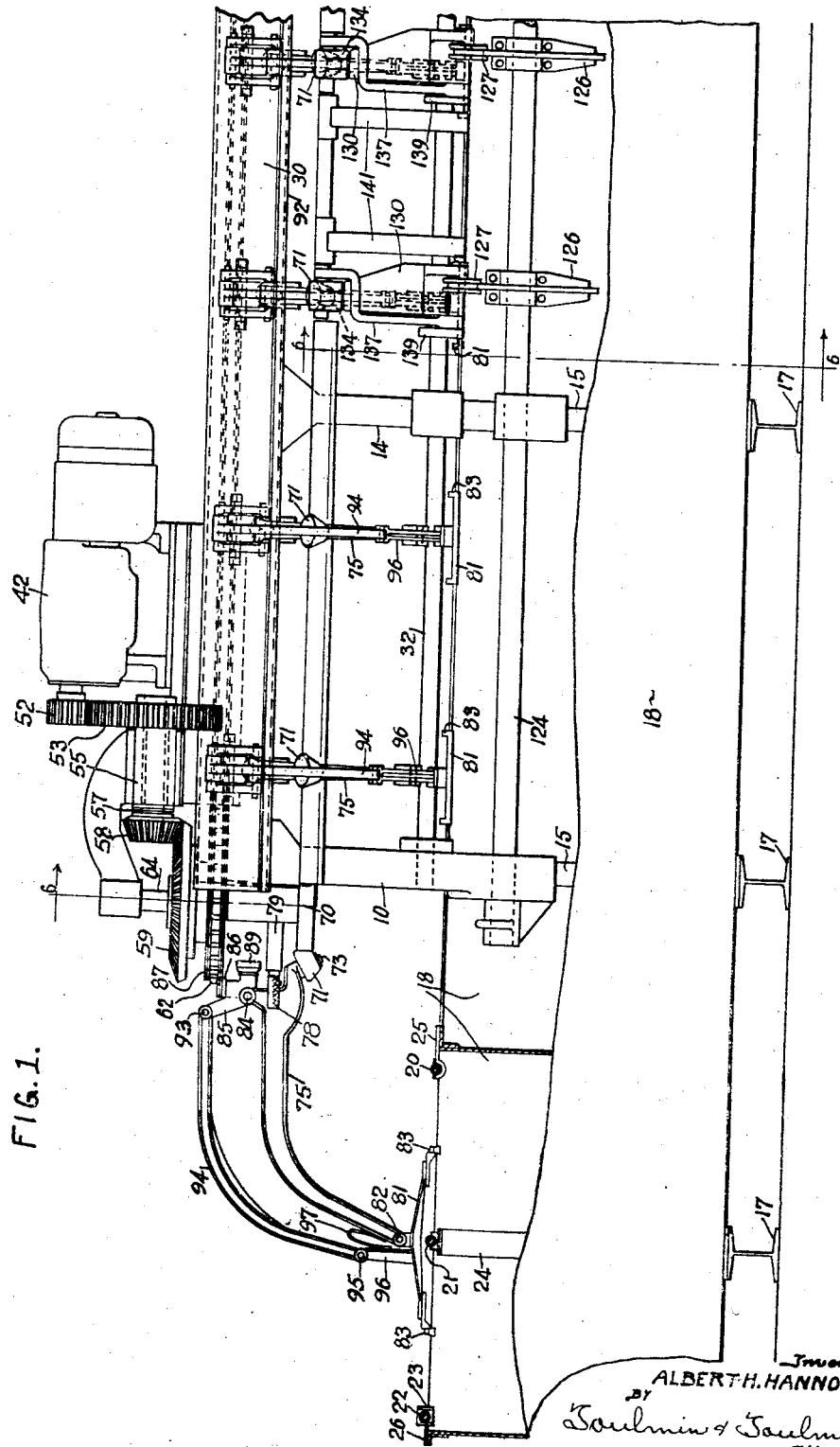

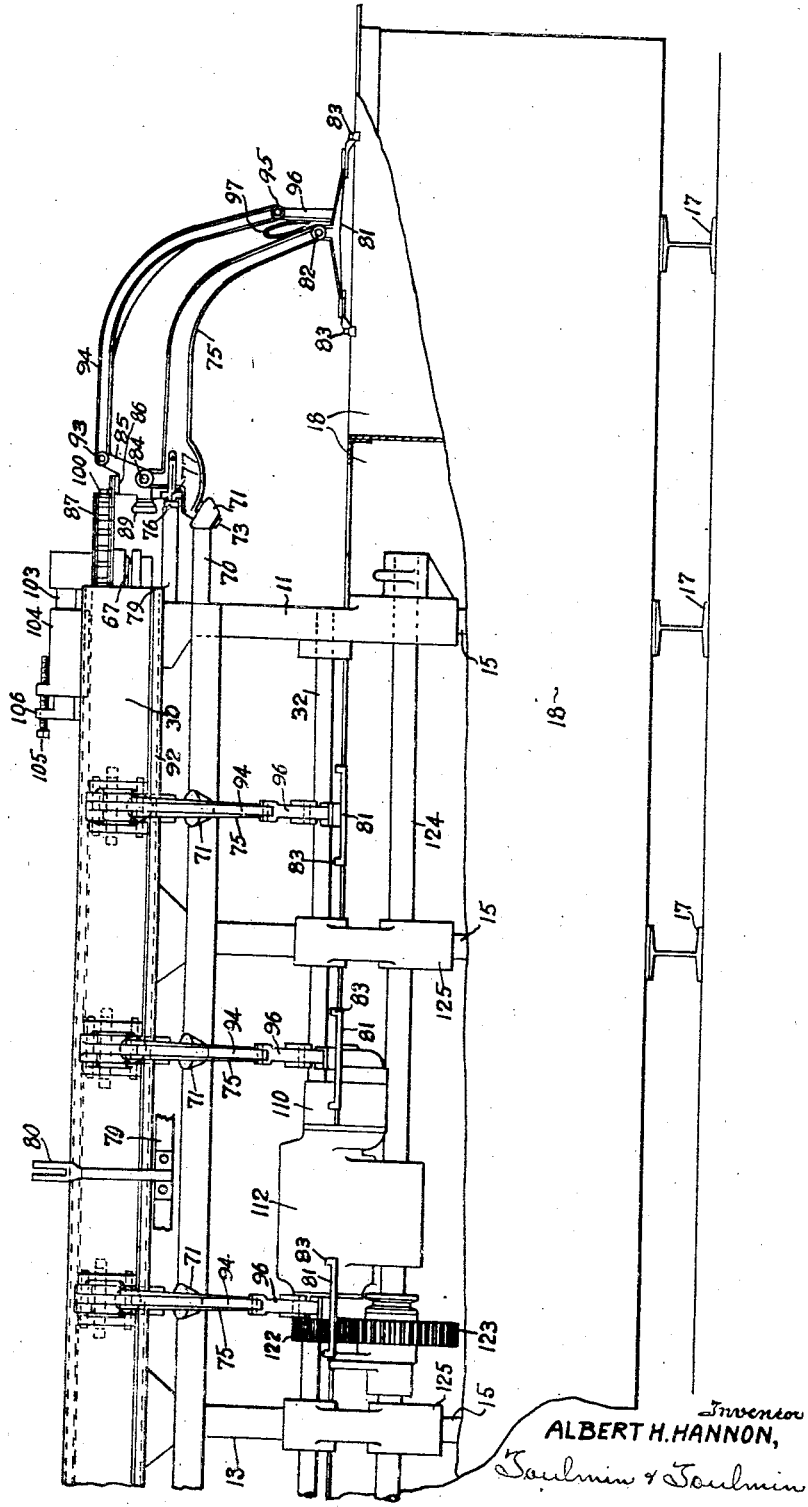

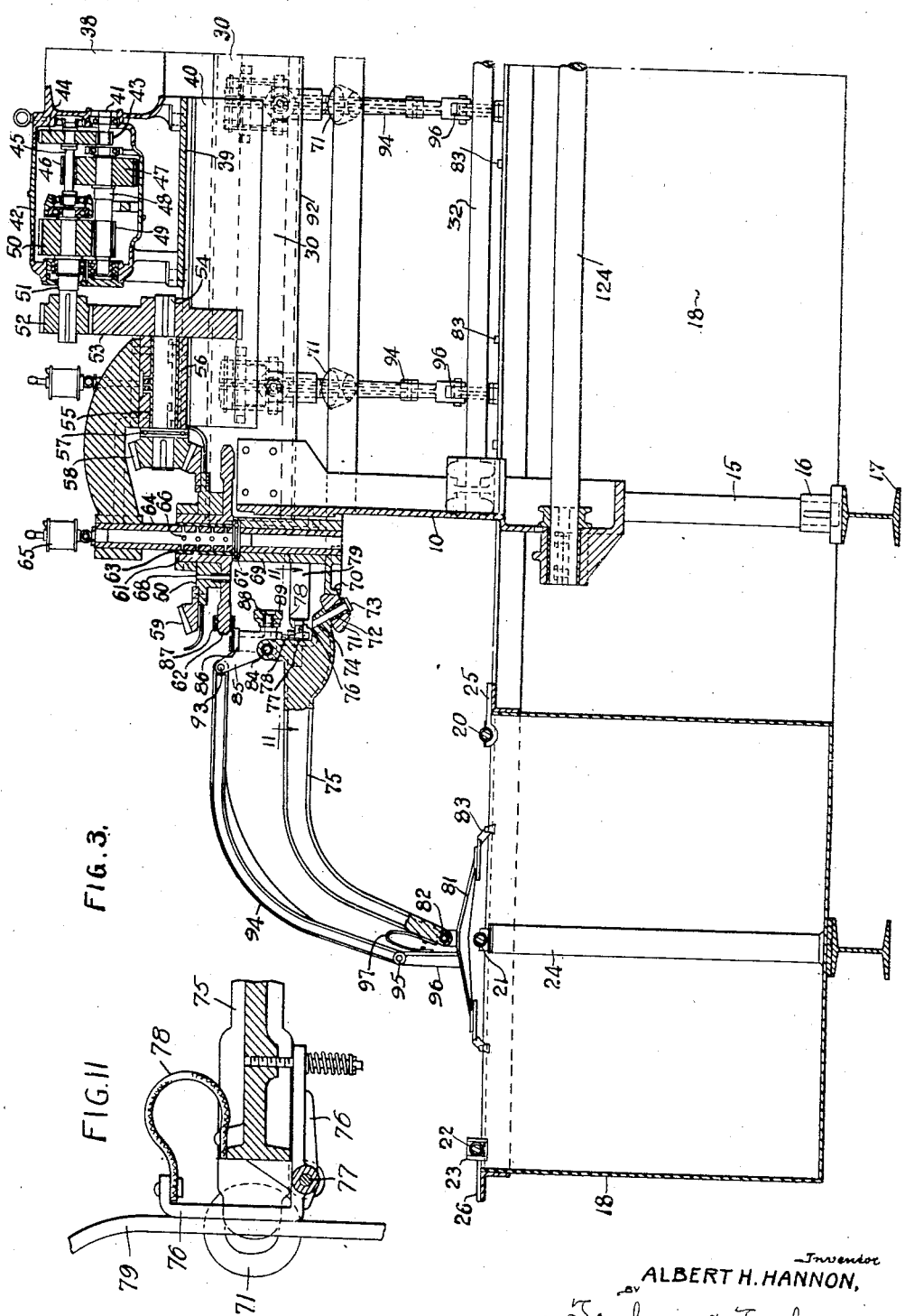

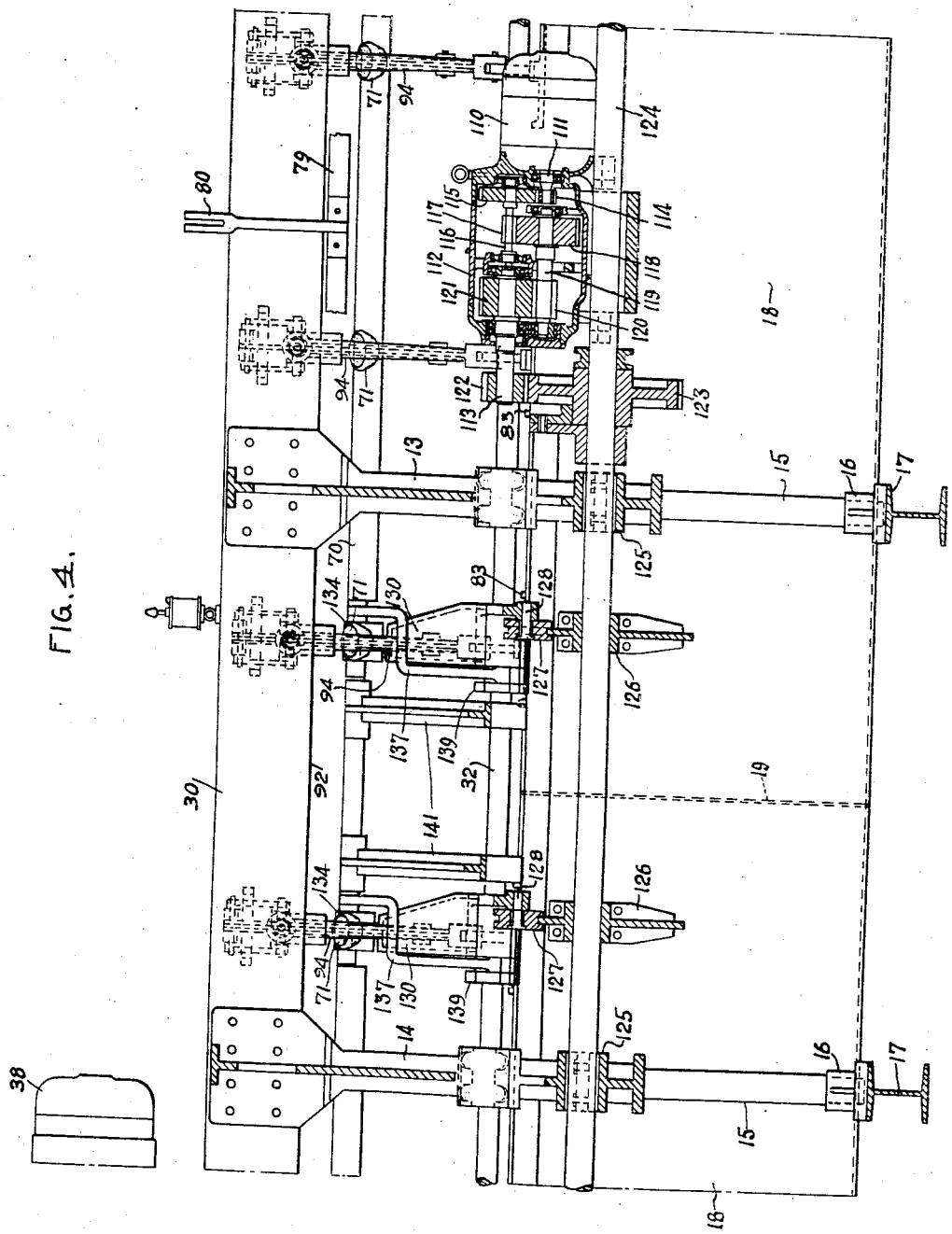

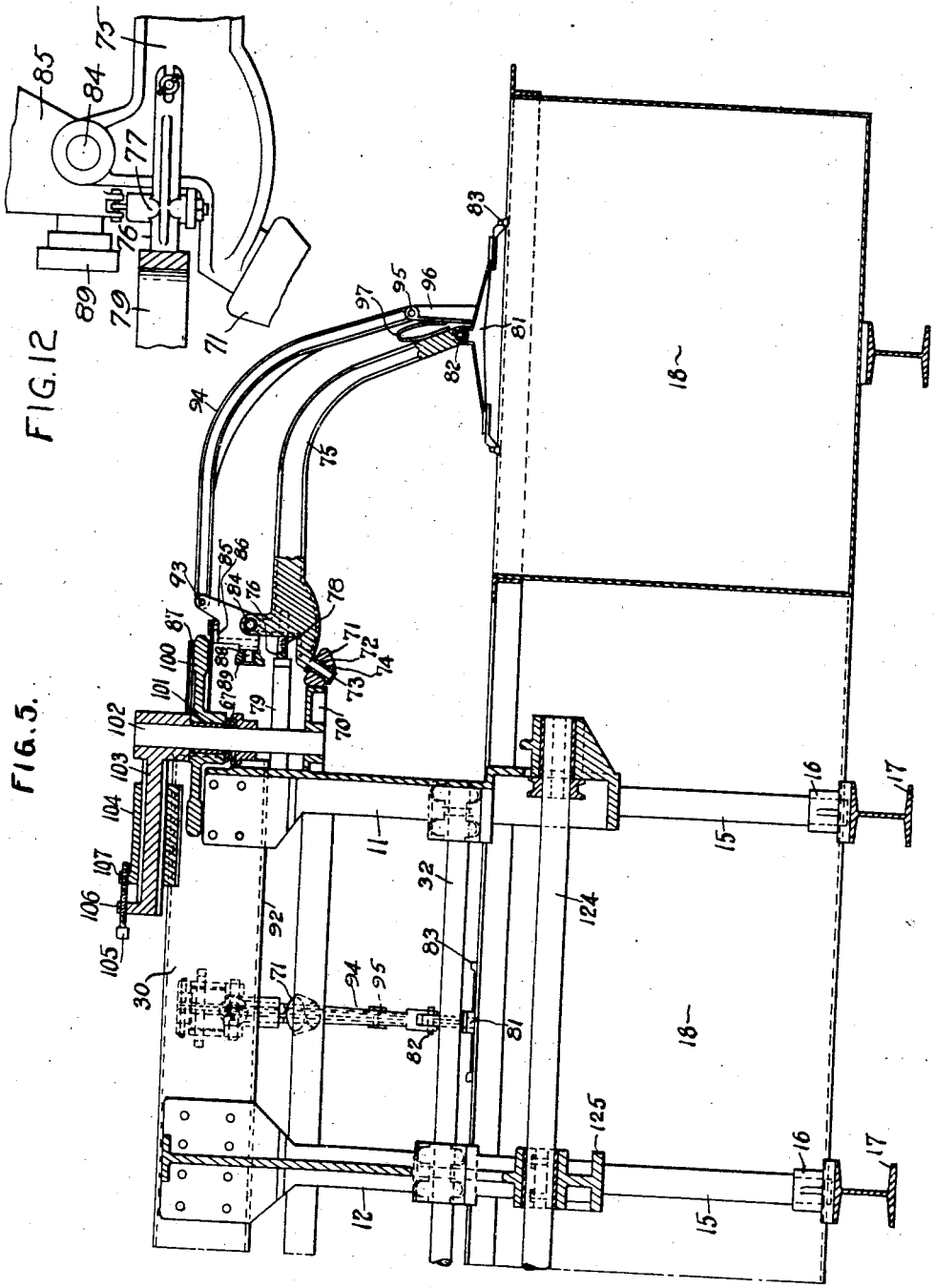

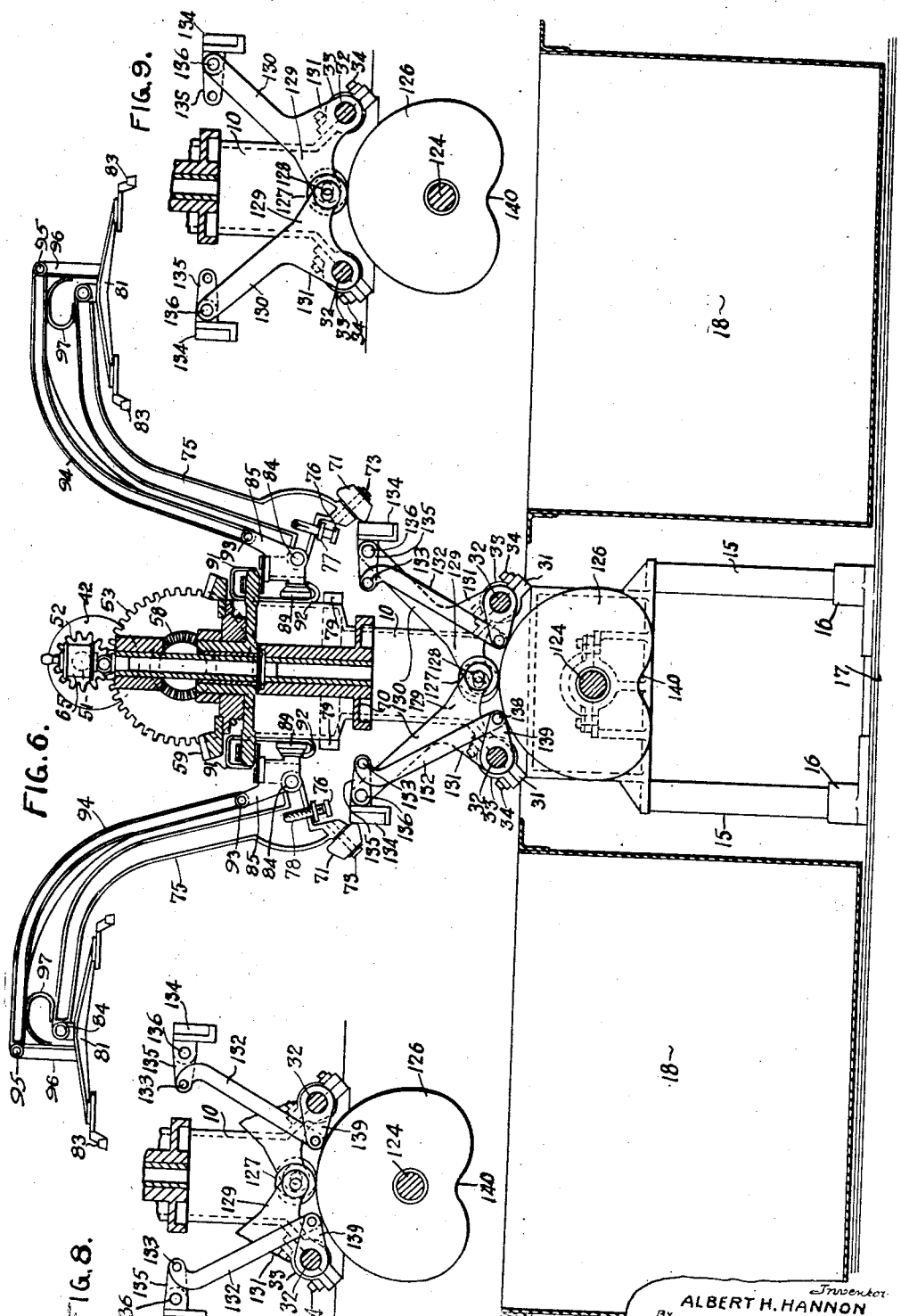

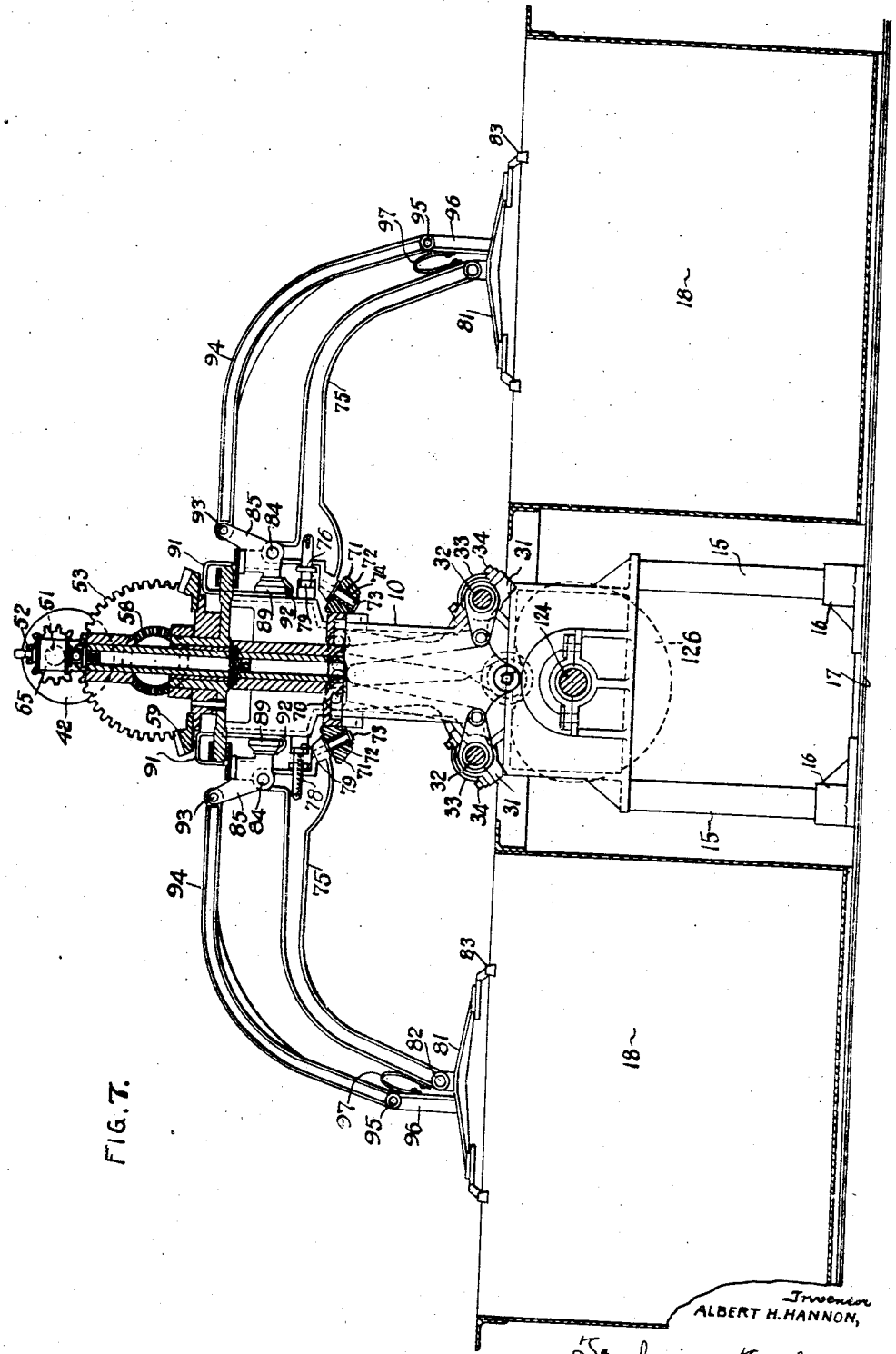

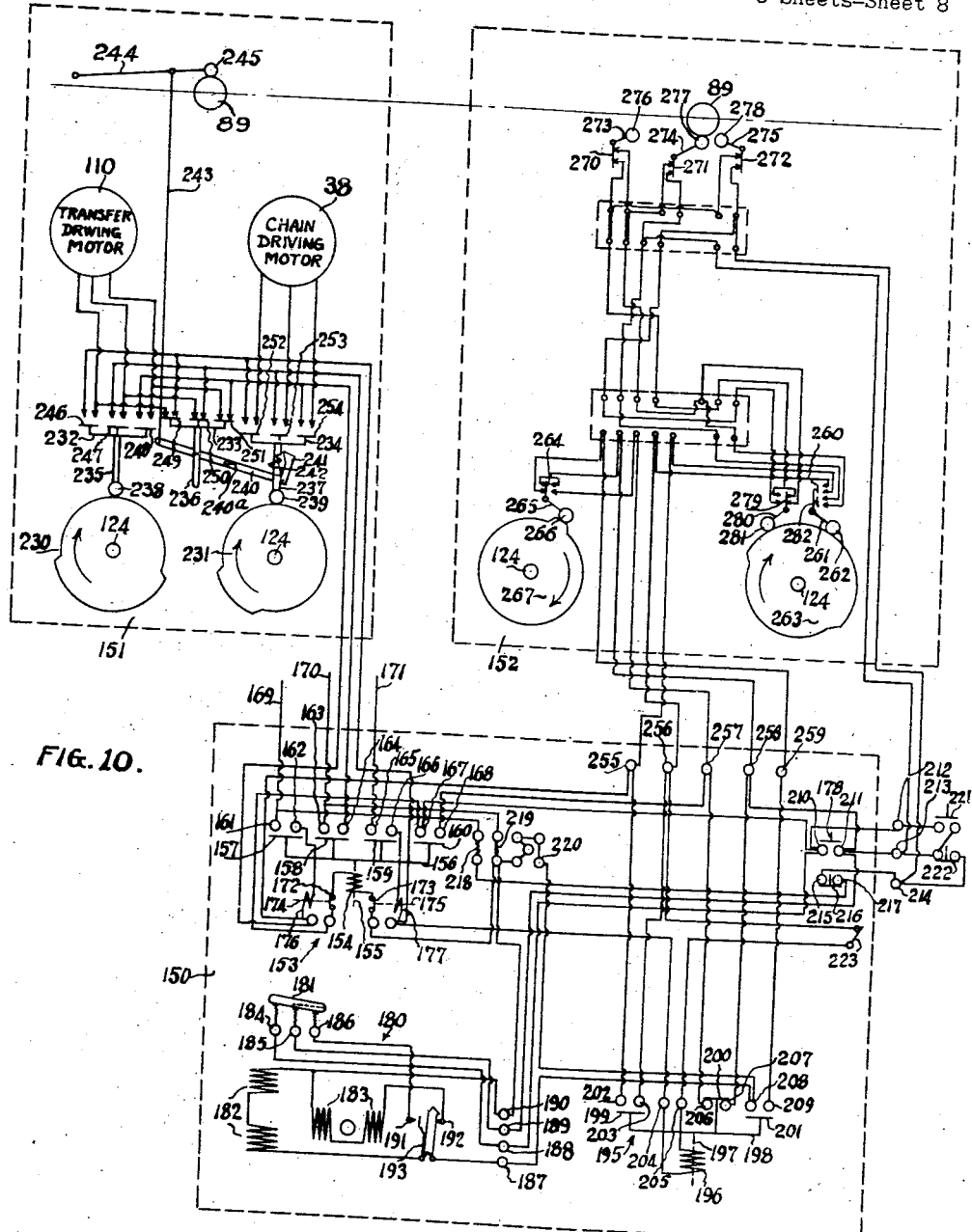

2,256,560

UNITED STATES PATENT OFFICE 2,256,560

ELECTROPROCESSING MACHINE

Albert H. Hannon, Springfield, Ohio

Application July 17, 1936, Serial No. 91,169

20 Claims. (Cl. 204—205)

This invention relates to electroprocessing machines, and in particular, to the so-called automatic electroprocessing machine wherein the work-pieces are automatically conveyed through various tanks and are automatically lifted over the partitions between the tanks.

One object of this invention is to provide an electroprocessing machine, wherein the transfer mechanism for lifting the carrier arms over the partitions between tanks is driven independently of the horizontal conveying mechanism which may be halted temporarily for predetermined periods of time as regulated by a timing device so that the time of plating or electroprocessing may be varied without correspondingly altering the time of transfer. In this manner a quick transfer may be maintained, even when the time of plating is slowed down, or the time of plating may be greatly increased without increasing the time of transfer.

Another object is to provide an electroprocessing machine having a controlling arrangement whereby the horizontal conveyor is brought to rest when the transfer is made, so that when the horizontal conveyor stops the vertical lifting mechanism then raises the carrier arms; when the carrier arm has reached its highest position the horizontal conveyor again starts to move horizontally until the carrier arm has reached its "set-down" position over the next tank, whereupon the transfer mechanism is again operated to lower the arm and the work carrier rack into that tank.

Another object is to provide a carrier arm arrangement wherein the carrier arm is pivotally supported on a bracket which is attached to the chain, and is provided with a roller for supporting the weight of the bracket and chain, this roller running in a track formed by an extension of the guard for the conveyor chain.

Another object is to provide a control system for an electroprocessing machine wherein an alternately intermittent movement is applied to the horizontal conveyor and the carrier arms, respectively, so that when the conveyor stops the carrier arms rise and either lift the arms out of one tank or lower them into the succeeding tank, a rest period being provided so as to vary this intermittent movement and accordingly vary the time of electroprocessing, such as cleaning and plating. This rest period is preferably regulated by the time-responsive means, such as an electric time relay.

Another object is to provide a carrier arm assembly for an electroprocessing machine, wherein a contact pad is universally mounted on the carrier arm for supplying current from the conductor to the work for electroprocessing, such as cleaning or plating, with flexible means, such as flexible cables, for bridging the interval between the contact pin and the work carrier arm.

Another object is to provide a lifting mechanism assembly for lifting carrier arms over partitions between tanks, wherein a contact member is provided which is thrust forwardly in substantially parallel planes as the lifting operation proceeds, this lifting being preferably accomplished by cam means cooperating with rollers, and a linkage maintaining this condition of parallelism.

In the drawings:

Figure 1 is a side elevation of the left-hand end of the machine, with the tanks broken away to disclose more clearly the operating mechanism.

Figure 2 is a side elevation, similar to Figure 1, but of the right-hand end of the machine.

Figure 3 is a vertical longitudinal section through the left-hand end of the machine.

Figure 4 is a vertical longitudinal section, similar to Figure 3, but through the central portion of the machine.

Figure 5 is a vertical longitudinal section, similar to Figures 3 and 4, but through the right-hand end of the machine.

Figure 6 is a cross section along the line 6—6 of Figure 1, showing the carrier arms and lifting mechanism in their raised positions.

Figure 7 is a view similar to Figure 6, but with the carrier arms and lifting mechanism in their lowered positions.

Figure 8 is a detail view, somewhat diagrammatic, of the lifting mechanism shown in Figures 6 and 7, with certain parts broken away to disclose the construction more clearly.

Figure 9 is a detail view similar to Figure 8, but with the parts differently broken away to amplify the disclosure of Figure 8.

Figure 10 is a wiring diagram of the electrical control circuit employed in the electroprocessing machine of this invention.

Figure 11 is a horizontal section taken along the line 11—11 in Figure 3, and showing details of the electrical connections between the conductor rail and the work carrier arms. Figure 12 is an enlarged side elevation of the parts shown in Figure 11, viewed from the same direction as Figure 2.

Figure 13 is a diagrammatic illustration of the cams of the lifting mechanism and shows their relative positions during operation of the electroprocessing machine.

Figure 14 is a view illustrating diagrammatically the coaction between the conveyor chain bracket roller and safety switch operating mechanism as the conveyor chain is moved along its orbital path.

Figure 15 is a schematic layout of the surfaces of the cams illustrated in Figure 13 showing the time and motion schedule for each cam relative to the conveyor chain and carrier arm lifting and transfer mechanism.

*General construction*

Referring to the drawings in detail, Figures 1 and 2 show the electroprocessing machine of this invention as mounted upon end posts 10 and 11 and intermediate posts 12, 13 and 14. These posts are mounted upon stanchions 15, which in turn, rest in sockets 16 secured to the bottom cross members 17. The latter are preferably of channel cross section and rest upon the floor of the building in which the machine is located. The bottom cross members 17 also serve to support the tank assembly, generally designated 18.

The tank assembly 18 consists of a series of tanks or a single tank with a series of partitions, the assembly being in approximate U-shape form. The mechanism supported by the stanchions 15 and posts 10 to 14 is arranged within the arms of the tank assembly 18, the circular portion of the tank passing around one end of the machine. The open end of the U-shaped tank is employed, respectively, for loading the work-pieces and for unloading the processed work-pieces. The tank assembly 18 is divided transversely at various points by partitions 19, transfer mechanism being provided, as hereinafter explained, for transferring the work-pieces over these partitions from one portion of the tank to the other.

For the purpose of supplying electricity to the tank for the electroprocessing operations, anode rods 20, 21 and 22 are provided, and a generator connection 23 is provided for connecting the conductor from the generator to the anode rods. The central anode rod 21 is supported by the anode rod support 24, whereas the inner and outer anode rods 20 and 22 are supported respectively by the anode rod supporting brackets 25 and 26 (Figure 3).

The vertical posts 10 to 14, inclusive, are secured to and interconnected by horizontal top members 30, constituting chain guides, as will subsequently appear. The chain guides 30 form a frame upon which the operating mechanism of the machine is supported. The posts are also provided at their lower portions (Figure 7) with laterally extended portions 31, within which are secured longitudinal shafts 32, held rigidly in place by the clamping members 33. The shafts 32 serve not only as frame members but also to support certain parts of the transfer and lifting mechanism, as hereinafter explained. The clamping members 33 are secured to the lateral extensions 31 in any suitable manner, as by the cap screws 34.

*Horizontal conveyor and carrier arm construction*

The horizontal conveying mechanism of the machine is driven by a motor 38 (Figure 3) mounted upon the base plate 39, which in turn, is supported upon the bracket 40 secured to the chain guides 30. The motor shaft 41 enters a geared reduction unit, generally designated 42, a train of gears therein reducing the speed of the motor. For this purpose the motor shaft is provided with a pinion 43, which drives a gear 44 upon a shaft 45, the latter having a pinion 46 driving a gear 47 upon a shaft 48. The shaft 48 carries a pinion 49 driving a gear 50 upon the output shaft 51 of the reduction unit 42. The output shaft 51 carries a pinion 52 which drives a gear 53 upon the shaft 54, the latter being rotatably mounted in the bearing bushing 55 mounted in the bearing support 56, carried by the bracket 40.

A thrust bearing sustains longitudinal thrusts along the shaft 54, and immediately adjacent thereto is a bevel pinion 58. The latter drives a bevel gear 59 attached to the shear pin hub 60, within which is the hub 61 of the sprocket 62. Within the hub 61 is a bearing bushing 63, supported upon a tubular shaft 64 having an oiling reservoir 65 for supplying oil to the bushing 63 by way of the apertures 66. The thrust bearing 67 is arranged to sustain vertical thrusts and the weight of the bevel gear 59 and sprocket 62. Shear pins 68 drivingly interconnect the shear pin hub 60 of the bevel gear 59 and the sprocket 62, these pins 68 being adapted to be sheared off in case of a jamming of the mechanism, thereby severing the driving connection and preventing damage to the machinery.

Below the thrust bearing 67 is a bracket 69 (Figure 3), having an arcuate rail 70 passing around the end of the machine. Engaging this rail 70 is a roller 71 surrounding an insulating sleeve 72 within which is a pin 73 seated in a bore 74 in the inner end of the carrier arm 75. The carrier arm 75 is likewise provided with a bronze contact pad 76 universally mounted thereon, as at 77, and connected thereto by the flexible cable 78. The contact pad 76 serves to engage the cathode rail 79 (Figure 7), the latter being connected at the connection 80 to the line running to the negative pole of the generator. In this manner current is conveyed from the cathode rail 79 to the carrier arm 75 and thence to the work-pieces by way of the tilting arm 81 pivoted thereto, as at 82, and having at its ends extended portions 83 for carrying racks for the work-pieces.

The work carrier arm 75 is pivotally mounted upon the rod 84 (Figure 3), supported in the chain bracket 85. The latter is connected by a link 86 to the side plates of the conveyor chain 87, driven by the sprocket 62. The chain bracket 85 is provided at its lower portion with a pin 88 which carries a roller 89. Each chain guide 30 (Figures 6 and 7) has an upper portion 91, partially surrounding the conveyor chain 87, and a lower portion 92 bent to form a channel-like rail in which the roller 89 is adapted to travel. In this manner the chain guide 30 serves to guide the chain 87 as well as to support the weight thereof by way of the chain bracket 85 and its associated roller 89 (Figures 6 and 7).

Pivotally mounted upon the pin 93 upon the upper portion of the chain bracket 85 is an equalizer arm 94, the lower end of which is pivoted on the pin 95 joining it to the extension member 96, rigidly attached to the tilting arm 81. A flexible conductor 97 interconnects the work carrier arm 75 and the extension member 96 in order to convey current to the tilting arm 81 (Figure 3). The conveyor chain 87 pursues an orbital path around the central portion of the machine, and at the end opposite the sprocket 62 is supported by an idler sprocket 100. The latter is provided with a bearing bushing 101 by which it is rotatably supported upon a vertical shaft 102. This shaft is mounted at the end of a slide 103, which is adapted to reciprocate in guideways 104 for the purpose of tightening or loosening the conveyor chain 87. This adjustment is obtained by rotating a screw 105 which passes through threaded projections 106 and 107 on the slide 103 and guideways 104, respectively.

The lifting mechanism whereby the carrier arms 75 are elevated to lift the work-piece racks over the partitions between tanks is driven by the cam-driving motor 110 (Figure 4), the drive shaft 111 of which enters the geared reduction unit 112 and drives the output shaft 113 thereof through a train of gears. The pinion 114 on the motor drive shaft 111 drives a gear 115 on a shaft 116, having a pinion 117 driving a gear 118 on a second shaft 119. The latter carries a pinion 120 driving a gear 121 on the output shaft 113. In this manner the speed of the motor drive shaft 111 is greatly reduced at the output shaft 113. The latter carries a pinion 122 which meshes with a gear 123 upon the cam shaft 124, this being journalled, as at 125, in the various vertical posts 10 to 14. The cam shaft 124 is provided with a plurality of cams 126 at intervals along the shaft, these cams being formed in halves and bolted together around the cam shaft 124.

The cams 126 are heart-shaped and are engaged by grooved rollers 127 mounted on pins 128. Each pin 128 is mounted in one arm 129 of a Y-shaped lever 130, another arm 131 of which (Figures 6, 7, 8 and 9) is mounted upon the shaft 32. The remaining arm 132 is provided with a pin 133 upon which a pad 134 is pivotally supported, this pad having an arm 135 with a pivot pin 136, to which is attached one end of an equalizer link 132. The opposite end of the latter is pivotally mounted upon a pin 138 which is secured in the end of an arm 139 fixedly mounted upon the stationary shaft 32.

As the cams 126 are rotated by the rotation of the cam shaft 124, the rollers 127 move upwardly and cause the Y-shaped levers 130 to move outwardly. At the same time the equalizer links 132, anchored at one end to the arms 139, cause the pads 134 to maintain successively vertical positions as the pads move outwardly because of the fact that the pivot points 32, 138, 133 and 136 are arranged in a parallelogram-like position so as to form a parallel linkage. In this manner the rollers 71 are engaged and pushed upwardly by the pads 134, thereby raising the carrier arms 75 and the workpieces supported by them. The equalizer arms 94 associated with the carrier arms 75 maintain the tilting arms 81 in successively parallel positions as this operation occurs. As the cam 126 continues to rotate the rollers 127 move into the indented portion 140 thereof, causing the U-shaped arms 130 to recede, thereby lowering the work carrier arms 75. Between the transfer positions the rollers 71 roll along against the rails or roller tracks 70, these being supported along the sides of the machine by the brackets 141 secured thereto (Figure 4) and having their opposite ends resting upon the stationary shafts 32.

*Electrical circuit and electrical elements*

The electrical circuit in the present machine is arranged to control the operation of the chain driving motor 38 and cam shaft driving motor 110 so as to cause the chain 87 to move the carrier arms 75 until they approach a partition between the various tanks. At this point the electrical control system comes into operation to halt the chain driving motor 38 and chain 87, bringing the carrier arm 75 to rest. When this occurs the electrical control system brings the cam driving motor 110 into operation to move the lifting arms 130 and lift the carrier arms 75 vertically until the work-pieces are safely clear of the partitions.

The control system then comes into action to re-start the chain driving motor 38 and operate the chain 87 to move the elevated carrier arms 75 by such a distance as will carry them beyond the partitions, whereupon the control circuit again comes into play to halt the horizontal motion of the chain 87. The control circuit then operates the cam driving motor 110 to retract the lifting arms 130 and lower the work carriers 75 and their contents into the next tank or tank section. The control system finally comes into play again when the lowering has been accomplished, causing the chain driving motor 38 and chain 87 to re-start and move the work carrier arms 75 horizontally until they arrive at the next partition, whereupon this cycle of operations is repeated.

The electrical circuit required to accomplish this operation is shown in Figure 10. This circuit consists primarily of three main assemblies or sub-circuits, namely, an intermittent control circuit, generally designated 150, a synchronizing circuit, generally designated 151, and a safety circuit, generally designated 152. As will be subsequently pointed out, certain switches in the intermittent control circuit are located within the dotted lines inclosing the safety circuit 152, these switches being located therewithin for purposes of convenience because they are operated by the same cams which operate the safety circuit switches.

The intermittent control circuit 150 provides control of the duration of the stopping period of the machine as more fully explained below in connection with the operation of the machine, together with overload and no-voltage relays for the chain driving motor 38 and the cam driving motor 110. The synchronizing circuit 151 maintains the two motors 38 and 110 in proper relationship with each other. The safety circuit 152 is normally dormant and comes into play only when the various elements of the machine get out of step, or an accident occurs which throws the elements out of their proper timing. When such an abnormal situation arises the safety circuit 152 comes into play to stop the chain driving motor 38 and the cam driving motor 110 to prevent damage to the mechanism, such as might occur by a collision between the work carrier arms 75 and the lifting arms 130 if the latter had not returned to their positions before they approach the former.

The intermittent control circuit 150 contains a standard type magnetic motor starter, generally designated 153, having an operating coil 154 which operates an armature 155 having a cross bar 156 with switch bars 157, 158, 159 and 160, arranged to bridge four pairs of contacts 161 to 168, inclusive. To the contacts 161, 163 and 165 are joined the main lines 169, 170 and 171, respectively. These main lines convey the current from the current mains to the control circuit, and a manual line switch (not shown), with the usual fuses, may be inserted for rendering the entire circuit manually inoperative.

The motor starter 153 is also provided with overload thermo-relays 172 and 173, having armatures 174 and 175, operated by the coils 176 and 177. Upon an excessive load being maintained for any considerable period of time, these thermo-relays come into operation to break the circuit in the holding coil 154 and cause the member 153 to fall out, stopping the motors. The thermo-relays 172 and 173 may be of any suitable type, such relays being known to those skilled in the art. These relays may be re-set manually a few minutes after the motors have stopped. As will be subsequently seen, the contacts 167 and 168 operate a holding circuit for maintaining the energization of the operating coil 154 when the starting button 178 is released by the operator.

Associated with the motor starter 153 in the intermittent control circuit 150 is a timing relay, generally designated 180, of any suitable type, such as known to those skilled in the art. The timing relay 180 consists of a small induction motor driving a train of gears and having an adjustable pawl together with a pair of coils 182. The latter actuate an armature, which in turn, controls the pawl together with the associated switch contacts, as explained more fully below. This timing relay 180 is provided with a three-pole mercury switch 181 adapted to be tilted to and fro by a timing motor (not shown) at the end of its operating period. When current is supplied to the coils 182 and timing motor coil 183, the coils 182 operate the armature to bring the timing motor into operative engagement with the timing mechanism, such as the train of gears, which after a predetermined time, tips the mercury switch 181. In the meantime, in the present invention, the above-mentioned pawl is operated by the armature of the coils 182 to engage the train of gears so that the timing motor having the motor coil 183 which is connected in multiple with these coils 182, drives the above-mentioned train of gears, and after a predetermined time tips the mercury switch 181. The details of this timing relay 180, in themselves form no part of the present invention, and any suitable timing device may be used.

The mercury switch 181 is provided with three poles 184, 185 and 186, and so arranged that the contacts 185 and 184 must "make" before the contacts 185 and 186 "break". One side of the coils 182 is connected to the terminal 187. The poles 184 and 185 are connected, respectively, to the terminals 188 and 189, whereas the remaining side of the coils 182 is connected to the terminal 190. The pole 186 is connected to a contact 191 arranged opposite a contact 192, connected to one side of the timing motor coils 183. Upon the energization of the coils 182 and 183, the switch blade 193 is operated to connect the mercury switch pole 186 to the terminal 187, the latter being otherwise connected to the timing motor coils 183.

Likewise associated with the motor starter 153 and the timing relay 180 in the intermittent control circuit 150 is a magnetic contactor 195, having an operating coil 196 under the control of a switch operated by a rotary cam which also controls a portion of the safety circuit 152, as hereinafter explained. The coil 196 is arranged, when energized, to operate an armature 197 and move a cross bar 198 having switch blades 199, 200 and 201. The magnetic contactor 195 is provided with eight contacts, 202 to 209, inclusive. The energization of the holding coil 196 causes the switch blades 199 and 201 to interconnect the contacts 202 and 203, also 208 and 209, respectively, whereas the same motion breaks the connection between the contacts 206 and 207 by the separation therefrom of the switch blade 200.

The starting button 178 is provided with contacts 210 and 211, these being led out to terminals 212 and 213, respectively. A terminal 214 is connected to one contact 215 of a stop switch 216, the opposite contact 217 of which is connected, through a fuse 218, to the contact 161 of the motor starter 153. Another fuse 219 is interposed in the line interconnecting the motor starter switch contact 163 and the timing relay terminal 190. A plurality of incandescent light bulbs 220 is likewise interposed in series in the line running from the fuse 219 to the contact 208 of the magnetic contactor 195. The lighting of these bulbs 220 indicates when the circuit is in operation. Additional starting and stopping switches 221 and 222, respectively, may be connected to the terminals 212, 213 and 214 for the purpose of controlling the machine from a remote point. A manual switch 223 is likewise interposed in series with the operating coil 196 of the magnetic contactor 195 in order to disable the latter when it is desired to cut out the operation of the timing relay 180 and run the machine continuously.

For purposes of convenience certain of the external connections of the magnetic contactor 195 are brought out to terminals 255, 256, 257, 258 and 259. The terminals 255 and 256 are connected to a single-throw mercury switch 260 operated by a member 261 having an operating roller 262, adapted to engage a cam 263. Similarly, the terminals 257, 258 and 259 are connected to a double-throw mercury switch 264, so arranged as to close one pair of its contacts before opening the other pair, and operated by a member 265 having a roller 266 engaging a cam 267. The cams 263 and 267 are mounted upon a cam shaft 124, and are shown in Figure 10 as separated from one another, although in practice they are preferably mounted side-by-side or combined with one another in an integral cam. The mercury switches 260 and 264 are shown as included within the safety circuit 152 for the sake of convenience, because the switch 260 is operated by the same cam which operates other switches used in connection with the safety circuit. These other switches will be described later.

The synchronizing circuit 151 consists of a mechanically operated switch assembly actuated by cams 230 and 231, mounted upon the cam shaft 124 and associated with a tripping mechanism operated by a cam or the chain bracket roller 89. The cams 230 and 231 (Figure 10) are shown for convenience as separated from one another, whereas in the actual machine they are preferably placed side-by-side or made integral with one another. The mechanical switch assembly operated by these elements consists of three three-pole switches 232, 233 and 234, having push rods 235, 236 and 237. The push rods 235 and 237 are provided with rollers 238 and 239 for engaging the cams 230 and 231, respectively. To the push rod 236 is pivoted a lever 240 pivotally mounted upon the fulcrum 240ª and having a tripping member or latch 241 adapted to engage a notch 242 in the push rod 237. Connecting means, shown diagrammatically by the line 243, mechanically connects the lever 240 with the arm 244, having a roller 245 adapted to be engaged by the chain bracket roller 89 as the latter passes underneath the former during its horizontal motion around its orbital path. The switches 232, 233 and 234 are provided with switch blades 246 to 254, inclusive, adapted to bridge pairs of lines when they engage the latter.

One switch 234 governs the connection of the current to the chain driving motor 38, whereas the other two switches 232 and 233 are connected in multiple and govern the distribution of current to the cam driving motor 110. Current to these switches is supplied from lines running to the motor starter 153. The switches 232, 233 and 234 are shown in a position of rest, with one of the cam motor switches 233 closed and the other switch 232 open. The chain motor switch 234 is also open.

The safety circuit 152 (Figure 10) is shown as including the switches 260 and 264. These switches, however, as previously stated, are associated with the intermittent control circuit 150 and are shown in the safety circuit 152 because they are actuated by the same cams which actuate the safety circuit switches. The safety circuit 152 is provided with three single-throw mercury switches 270, 271 and 272, actuated by the members 273, 274 and 275, having rollers 276, 277 and 278 arranged to be engaged by the chain bracket roller 89 as it moves in its orbital path around the machine.

Associated with the chain-operated mercury switches 270, 271 and 272 are the mercury switches operated by the cam 263. One mercury switch 279 is a double-throw switch operated by the member 280, having the roller 281, whereas the other mercury switch 282 is a single-throw switch operated by the same member 261 which operates the mercury switch 260, previously described in connection with the intermittent control circuit. The safety circuit is a normally closed circuit and is connected to the intermittent control circuit at the terminals 213 and 214 on the right-hand side of Figure 10, between the starting button 178 and stopping button 216.

The switch 270 is operated by the member 273 and roller 276 to insure the return of the lifter arm 130 and its pad 134 to their retracted positions, ready for the arrival of the next carrier arm 75. It will stop the machine in case the cam shaft motor should fail after the conveyor chain 87 has started forward, and before the lifter arm 130 and lifter pad 134 have returned to their retracted position, thereby stopping the machine before the following carrier arm runs in under the unretracted lifter pad 134. The switch 271, on the other hand, is provided to insure that all of the carrier arms 75 are in their proper positions to set down or lower their workpieces so that the cam shaft 124 cannot revolve to lower the carrier arms without opening the circuit at the switch 282. The switch 271, operated by the member 274 and roller 277, therefore insures that the carrier arms 75 shall be in their proper positions before they can be lowered. The switch 272 provides against an overrun of the chain bracket roller 89. In this event the opening of its associated switch 279 will open the safety circuit 152 and stop the machine unless the cam shaft 124 and cam 263 are in their proper positions, and the left-hand contacts of the switch 279 closed. The arrangement of the switches 270, 271, 272, 279 and 282 is such that if the chain bracket roller 89 opens one of the chain-operated switches 270, 271 or 272, the cam 263 maintains either of the switches 279 or 282 closed, each of the switches 271 and 272 having a cam-operated switch connected in multiple with it.

Should the machine cams be out of time, or the chain and carrier arms in incorrect position, such as might occur by the failure of either of the motors 38 or 110, or other associated apparatus either mechanical or electrical, one of the switches 270, 271 or 272 will be opened without its corresponding switch 279 or 282 being simultaneously closed. As each pair of switches is connected in series the circuit supplying current to the motor starter coil 154, under such circumstances, would be opened, thereby preventing the operation of the motor starter 153 and shutting off all current to both motors 38 and 110. As the safety circuit 152 is in series with the stopping push button switch 216, the motor cannot again be started by merely pushing the starting push button. Before this can be done it is necessary to correct the source of the trouble by readjusting the timing mechanism or resetting the cams until the machine parts are again in properly timed and positioned relationships.

It will be understood that the machine of this invention will operate without the safety circuit 152, and the latter can be rendered inoperative merely by shortcircuiting the terminals 213 and 214. The safety circuit 152, however, provides the valuable feature of preventing the operation of the machine when the parts are out of their proper relationships with each other. Otherwise, the safety circuit 152 remains inactive because none of its switch contacts normally ever breaks a circuit unless the machine is thrown out of properly timed relationship for some reason.

*Operation*

The mechanical operation of the machine has been described to some extent in connection with the construction of the various parts. The chain driving motor 38 is started by closing the motor starting switch 153, whereupon the chain 87 starts moving in an orbital path, carrying with it the carrier arms 75. As the carrier arms 75 arrive next to a partition the chain driving motor 38 will cease operating, and the chain 87 will come to a halt. By this time the carrier arm rollers 71 have arrived over the lifter pads 134. The electrical circuit now comes into operation to start the cam driving motor 110 to rotate the cam shaft 124 and the cams 126 so that the lifter arms 130 are actuated to push the lifter pads 134 outwardly and lift the carrier arms 75. When the carrier arms 75 reach the tops of their positions, the chain driving motor 38 is again operated to move the chain 87 and the carrier arms 75 horizontally over the partition. The chain driving motor 38 then stops and the cam driving motor 110 again is operated to lower the carrier arms 75 and their workpieces into the next tank. When the lowering has been completed the cam driving motor 110 stops, and the chain driving motor 38 restarts to move the chain 87 and the carrier arms 75 through the tanks toward the next partitions. The rest periods for the conveyor chain 87 occur at predetermined points where the carrier arms, during their horizontal movement, advance adjacent to the end wall of a tank. The duration of the rest periods corresponds to the time required to raise the carrier arms to its uppermost position in one instance and following the next horizontal movement of the chain 87, the rest period occurs for a time to allow the lowering of the arm from its uppermost position onto the chain 87.

The operation of the electrical circuit for bringing about this mechanical operation has been partly described in connection with the description of the circuits. When the starting switch button 178 is depressed, closing the circuit between the terminals 210 and 213 (Figure 10), current is supplied from the lines 169 and 170 leading to the switch contacts 161 and 163, through the fuses 218 and 219 to the actuating coil 154 of the motor starter 153, closing its switch blades 157, 158, 159 and 160. The switch blade 160 interconnects the contacts 167 and 168, which are in series, with the terminals 257 and 258 connected to the double-throw mercury switch 264 operated by the cam 267. These elements, with the stop switch 216 and contacts 206 and 207 form a holding circuit to keep the starter operating coil 154 energized after the starting button 178 is released, the terminals 257 and 258 being normally closed by the mercury switch 264 after partial rotation of the cam shaft.

As these terminals 257 and 258 are likewise adapted to be interconnected by the switch blade 200 of the magnetic contactor 195, the contacts 206 and 207 thereof being connected in multiple with one set of the contacts of the mercury switch 264, it will be seen that if the mercury switch 264 and the contactor switch blade 200 are both opened at the same time, or the stop button 216 is pressed, the operating coil 154 of the motor starter 153 will be deenergized, thereby opening this circuit and causing either or both of the motors 38 and 110 operating at that time to be shut off. If, however, the double-throw mercury switch 264 is tipped when the magnetic contactor 195 has been actuated by the closing of the mercury switch 260 so that the contacts 206 and 207 are disconnected by the separation therefrom of the switch blade 200, and the contacts 208 and 209 are connected by the switch blade 201 of the magnetic contactor 195, the circuit through the terminals 258 and 259 will first be closed so as to actuate the coils of the timing relay 180. As the mercury switch 264 is tipped further the circuit, through the terminals 257 and 258, will be opened and the holding circuit of the magnetic starter 153 will accordingly be opened through the contacts 167 and 168 thereof, thereby deenergizing the starter operating coil 154 and allowing the motor starter 153 to open.

Upon the actuation of the coils of the timing relay 180, in the manner above described, the switch blade 193 thereof, which is in series with the pole 186 of the mercury switch 181, is closed upon the contact 191, thereby providing a holding circuit for the coils 182. When the cam shaft 124 rotates the cam 263 a predetermined distance from its rest position, such as seventy-five degrees, the mercury switch 260 is tipped, closing the circuit through the terminals 255 and 256, which actuate the operating coil 196 of the magnetic contactor 195 in series therewith. The closing of the magnetic contactor 195 closes the circuit through its contacts 202 and 203, also through the contacts 208 and 209, and opens the circuit through the contacts 206 and 207. The closing of the circuit through the contacts 202 and 203 closes a holding circuit to hold the magnetic contactor 195 in its closed position after an additional revolution of the cam 263 by a predetermined amount, such as 190 degrees, the circuit through the contacts 255 and 256 being again opened by the opening of the mercury switch 260 before the rest position of the cam shaft 124 is again reached.

With the arrival of the cam shaft 124 at its rest position it brings the cam 267 into position to tip the mercury switch 264 so as to open the circuit through the right-hand set of contacts thereof, thereby opening the circuit through the terminals 257 and 258, deenergizing the motor starter operating coil 154 opening the motor starter 153. The same action closes the circuit through the left-hand contacts of the mercury switch 264, closing the circuit through the terminals 258 and 259 and starting the timing relay 180. Since the magnetic contactor 195 receives current from the motor side of the starter 153 only, it will immediately open when the motors are shut off, thereby closing the circuit through its contacts 206 and 207, and opening the circuit through its contacts 202 and 203, the magnetic contactor 195 now being in the position shown in Figure 10. This gives the same effect as tilting the mercury switch 264 back to its original position. After the timing relay 180 has operated for the predetermined period of time for which it is set, namely the period of time it is desired to temporarily halt the travel of the work being treated in the machine, the mercury switch 181 associated with it is tipped, thereby closing the circuit through its poles 184 and 185. This action again closes the circuit through the operating coil 154 of the motor starting switch, and then opens the circuit between the poles 185 and 186 of the mercury switch 181, thereby deenergizing both of the coils 182 and 183 and causing the timing relay 180 to become inoperative.

Since the holding circuit of the timing relay 180 is broken at the contacts 191 and 193 before the mercury switch 181 can again assume its normal position, the timing relay 180 will not again be energized until the circuit through the terminals 258 and 259 is again closed by a complete revolution of the cam shaft 124 and cam 267. The time setting of the timing relay 180 should preferably be more than two or three seconds, otherwise, the mercury switch 181 associated with it will be held in a position continually closing the circuit between the poles 185 and 184, thereby making the stop switch 216 inoperative.

The operation of the synchronizing circuit 151 is controlled by the action of the cams 230 and 231 on the cam shaft 124. When the starting switch 178 is pressed and the motor starter 153 closed, it will be seen from Figure 10 that only the cam driving motor 110 is connected to the current mains 169, 170 and 171. This causes the cam driving motor 110 to operate, rotating the cam shaft 124 and raising the carrier arms 75. After a predetermined amount of rotation of this shaft 124, such as one hundred degrees, the carrier arms 75 will be completely raised, whereupon the cam 231 operates to raise the push rod 237 so as to close the chain driving motor switch 234, thereby starting the chain driving motor 38 and causing the chain 87 to move the carrier arms 75 horizontally. As the chain bracket roller 89 travels out from underneath the synchronizing switch trip roller 245, the falling of this trip roller 245 causes the lever 240 to tilt about its fulcrum, urging the trip member or latch 241 upward into the notch 242 of the now raised push rod 237, so as to mechanically lock the chain switch 234 in a closed position. The same tilting of the lever 240 serves to open the cam motor switch 233. By this time, however, the cam 230 has rotated a sufficient amount to raise the push rod 235 and close the auxiliary cam motor switch 232 so that for a short time both motors 38 and 110 will operate together.

After the cam shaft 124 and cam 230 rotate through an additional predetermined amount, such as one hundred and sixty degrees, the cam motor switch 232 will be opened, thereby stopping the cam driving motor 110 and halting the rotation of the cam shaft 124. Any further revolving of the cam shaft 124 would tend to lower the work carrier arms 75 on the machine. After the conveyor chain 87 has carried the carrier arms 75 the required distance, as governed by the spacing of the arms, the synchronizing switch trip roller 245 will again be operated, thereby opening the chain motor switch 234, stopping the horizontal motion of the conveyor chain 87 and closing the cam motor switch 233. This action again starts the cam motor 110 and causes the cam shaft 124 to rotate to lower the work carrier arms 75.

The operation of the safety circuit has been sufficiently described in connection with the description of the circuit itself. Should the machine for any reason be out of time, one of the switches 270, 271, 272, 279 or 282 will be opened without its corresponding switch being closed at the same time, thereby opening the circuit supplying current to the motor starter operating coil 154, and accordingly opening the motor starter 153 and causing both motors 38 and 110 to be deenergized. The starting button 178, under these circumstances, is ineffective to re-start the machine because the safety circuit 152 is in series with it. Accordingly, it is necessary to adjust the machine so that it is properly timed before the starting button 178 becomes effective to start the machine.

The three safety switches 270, 271 and 272, operated by the chain bracket roller 89, are mounted in such a position that in the raised position of the machine the roller 277 is engaged by the chain bracket roller 89 to hold the switch 271 in closed circuit. At the same time, however, the switch 282 is maintained in open circuit by the rotation of the cam 263 on the cam shaft 124. After the cam 263 has rotated through a predetermined amount, such as one hundred degrees, thereby raising the carrier arms 75 for forward travel, the cam 263 tilts the mercury switch 282 to close its contacts, thereby bridging the contacts of the switch 271 and permitting the chain bracket roller 89 to become disengaged from the roller 277 and open the switch 274 without opening the safety circuit. When this occurs, however, the roller 278 is immediately engaged by the chain bracket roller 89 to open the mercury switch 272.

Meanwhile, the left-hand contacts of the switch 279, connected in multiple with the contacts of the switch 272, have been closed by the rotation of the cam 263, thereby rendering the opening of the circuit in the chain-operated switch 272 ineffective to stop the machine. The right-hand contacts of the switch 279, however, remain open, and until these are closed the subsequent chain bracket roller 89 cannot pass the roller 276 of the switch 270 without stopping the machine. However, after the cam shaft 124 and the cam 263 have rotated a predetermined amount, such as two hundred degrees, the mercury switch 279 will again be operated to close the right-hand contacts thereof so that the chain bracket roller 89 is then permitted to engage the roller 276 and operate its associated switch 270, thereby insuring the return of the lifter arm 130 and lifter pad 134 to their retracted positions, ready to receive the next carrier arm roller 71.

Thus, by the three circuits shown in Figure 10 the various mechanical and electrical elements are caused to cooperate in timed relationship so that they operate at predetermined times and produce the predetermined results of lifting the carrier arms at the proper point, transporting these arms horizontally a predetermined amount, lowering the carrier arms so that the work-pieces pass into the next tank, and then moving the carrier arms forward horizontally until the foregoing cycle of operations is repeated. The safety circuit, as previously explained, is inoperative as long as the various elements of the machine are maintained in properly timed relationship. In the event that any circumstance arises which interferes with the proper timing of the machine, the safety circuit immediately becomes operative to stop the driving motors and prevent damage to the machine. The electrical safety circuit 152 is, therefore, entirely supplementary to the mechanical safety device consisting of the shear pins 68 associated with the chain driving sprocket 62.

It will be understood that I desire to comprehend within this invention such modifications as come within the scope of the claims and the invention.

Having thus fully described my invention, what I claim as new and desire to secure by Letters Patent, is:

1. In combination in an electroprocessing machine, a tank, a work carrier comprising a parallelogram linkage member, means for moving the work carrier horizontally with respect to the tank with the work carrier both lowered into the tank and raised above the tank, means for moving the work carrier vertically with respect to the tank, and means responsive to the horizontal travel of said work carrier in its lowered condition to a predetermined horizontal position for rendering said horizontal moving means inoperative while rendering said raising means operative and responsive to the arrival of said work carrier at a predetermined vertical position for again rendering said horizontal moving means operative while rendering said vertical moving means inoperative.

2. In combination in an electroprocessing machine, a tank, a work carrier comprising a linkage means substantially in the shape of a parallelogram, means for moving the work carrier horizontally with respect to the tank with the work carrier both lowered into the tank and raised above the tank, means for raising and lowering the work carrier over the ends of the tank, means responsive to the horizontal travel of said work carrier in its lowered condition to a predetermined horizontal position for rendering said horizontal moving means inoperative while rendering said raising means operative, and means for rendering said lifting means inoperative while rendering said horizontal moving means operative in response to the raising of said work carrier to a predetermined height.

3. In combination in an electroprocessing machine, a tank, a work carrier comprising a parallel link means pivotally attached to a stationary member and arranged to support a tiltable work piece rack member, means for moving the work carrier horizontally with respect to the tank with the work carrier both lowered into the tank and raised above the tank, means for raising and lowering the work carrier over the ends of the tank, means responsive to the horizontal travel of said work carrier in its lowered condition to a predetermined horizontal position for rendering said horizontal moving means inoperative while rendering said raising means operative, means for rendering said lifting means inoperative while rendering said horizontal moving means operative in response to the raising of said work carrier to a predetermined height, and means for again rendering said horizontal moving means inoperative while rendering said lowering means operative in response to the arrival of the raised work carrier at a predetermined position.

4. In combination in an electroprocessing machine, a tank, a work carrier comprising a linkage means including a tiltable work piece supporting arm and an auxiliary arm associated therewith for maintaining said tiltable work piece supporting arm in successively parallel positions during the movement of said work carrier, means for moving the work carrier horizontally with respect to the tank with the work carrier both lowered into the tank and raised above the tank, means for raising and lowering the work carrier over the ends of the tank, means responsive to the horizontal travel of said work carrier in its lowered condition to a predetermined horizontal position for rendering said horizontal moving means inoperative while rendering said raising means operative, means for rendering said lifting means inoperative while rendering said horizontal moving means operative in response to the raising of said work carrier to a predetermined height, means for again rendering said horizontal moving means inoperative while rendering said lowering means operative in response to the arrival of the raised work carrier at a predetermined position, and means responsive to the lowering of said work carrier to a predetermined level to render said lowering means inoperative while rendering said horizontal moving means operative.

5. In combination in an electroprocessing machine, a tank, a work carrier comprising a linkage means including a tiltable work piece supporting arm and an auxiliary arm associated therewith for maintaining said tiltable work piece supporting arm in successively parallel positions during the movement of said work carrier, a conveyor for conveying said work carrier along said tank with the work carrier both lowered into the tank and raised above the tank, raising and lowering mechanism arranged at predetermined locations along said tank, means responsive to the horizontal travel of said work carrier in its lowered condition to one of said locations for halting said conveyor, and means responsive to the halting of said conveyor for operating said raising mechanism.

6. In combination in an electroprocessing machine, a tank, a work carrier comprising a linkage means including a tiltable work piece supporting arm and an auxiliary arm associated therewith for maintaining said tiltable work piece supporting arm in successively parallel positions during the movement of said work carrier, a conveyor for conveying said work carrier along said tank with the work carrier both lowered into the tank and raised above the tank, raising and lowering mechanism arranged at predetermined locations along said tank, means responsive to the horizontal travel of said work carrier in its lowered condition to one of said locations for halting said conveyor, means responsive to the halting of said conveyor for operating said raising mechanism, and means responsive to the raising of said work carrier to a predetermined level to halt said raising mechanism and re-start said conveyor.

7. In combination in an electroprocessing machine, a tank, a work carrier comprising a parallel link means pivotally attached to a stationary member and arranged to support a tiltable work piece rack member, a conveyor for conveying said work carrier along said tank with the work carrier both lowered into the tank and raised above the tank, raising and lowering mechanism arranged at predetermined locations along said tank, means responsive to the horizontal travel of said work carrier in its lowered condition to one of said locations for halting said conveyor, means responsive to the halting of said conveyor for operating said raising mechanism, means responsive to the raising of said work carrier to a predetermined level to halt said raising mechanism and re-start said conveyor, and means responsive to the arrival of said raised work carrier at a predetermined position for halting said conveyor and starting said lowering mechanism.

8. In combination in an electroprocessing machine, a tank, a work carrier comprising a linkage means substantially in the shape of a parallelogram, a conveyor for conveying said work carrier along said tank with the work carrier both lowered into the tank and raised above the tank, raising and lowering mechanism arranged at predetermined locations along said tank, means responsive to the horizontal travel of said work carrier in its lowered condition to one of said locations for halting said conveyor, means responsive to the halting of said conveyor for operating said raising mechanism, means responsive to the raising of said work carrier to a predetermined level to halt said raising mechanism and re-start said conveyor, means responsive to the arrival of said raised work carrier at a predetermined position for halting said conveyor and starting said lowering mechanism, and means responsive to the lowering of said work carrier to a predetermined level for halting said lowering mechanism and re-starting said conveyor.

9. In combination in an electroprocessing machine, a tank, a work carrier comprising a parallelogram linkage member, a conveyor for conveying said work carrier along said tank, a motor for operating said conveyor, raising and lowering mechanism for raising and lowering said work carrier at predetermined locations along said tank, a motor for operating said raising and lowering mechanism, means arranged in a predetermined synchronized positional relationship for operating said conveyor motor, means responsive to the operation of said conveyor motor for rendering said raising and lowering motor inoperative, and means responsive to a departure from said predetermined synchronized relationship for halting said motors.

10. In combination in an electroprocessing machine, a tank, a work carrier comprising a parallelogram linkage member, a conveyor for conveying said work carrier along said tank, a motor for operating said conveyor, raising and lowering mechanism for raising and lowering said work carrier at predetermined locations along said tank, a motor for operating said raising and lowering mechanism, means arranged in a predetermined synchronized positional relationship for operating said conveyor motor, means responsive to the operation of said conveyor motor for rendering said raising and lowering motor inoperative, and means responsive to a departure from said predetermined synchronized relationship for halting said motors, said last-mentioned means comprising a plurality of switches arranged in the circuits of said motors and arranged to be closed during operation according to the predetermined relationship and opened upon a departure therefrom.

11. In combination in an electroprocessing machine, a tank, a work carrier comprising a linkage means substantially in the shape of a parallelogram, a conveyor for conveying said work carrier along said tank, a motor for operating said conveyor, raising and lowering mechanism for raising and lowering said work carrier at predetermined locations along said tank, a motor for operating said raising and lowering mechaism, means arranged in a predetermined synchronized positional relationship for operating said conveyor motor while rendering said raising and lowering motor inoperative, and means responsive to a departure from said predetermined synchronized relationship for halting said motors, said last-mentioned means comprising a pair of switches arranged in multiple in each motor circuit, at least one of said switches of each pair being maintained in a closed position during operation according to said predetermined relationship and both of said switches of each pair being opened in response to a departure from said predetermined relationship.

12. In combination in an electroprocessing machine, a tank, a work carrier, said work carrier comprising a linkage means attached to work piece support means which is arranged to maintain said work piece support in successively parallel positions during movement of said work carrier, a conveyor for conveying said work carrier along said tank, a motor for operating said conveyor, raising and lowering mechanism for raising and lowering said work carrier at predetermined locations along said tank, a motor for operating said raising and lowering mechanism, means arranged in a predetermined synchronized positional relationship for operating said conveyor motor, means responsive to the operation of said conveyor motor for rendering said raising and lowering motor inoperative, a motor starting switch, a time-responsive device for rendering said starting switch operative, and time-responsive means responsive to the arrival of said work carrier at a predetermined position along said tank for rendering said motor starting switch inoperative for a predetermined period of time.

13. In combination in an electroprocessing machine, a tank, a work carrier, said work carrier comprising a linkage means attached to work piece support means which is arranged to maintain said work piece support in successively parallel positions during movement of said work carrier, a conveyor for conveying said work carrier along said tank, a motor for operating said conveyor, raising and lowering mechanism for raising and lowering said work carrier at predetermined locations along said tank, a motor for operating said raising and lowering mechanism, an electrical circuit arranged to effect the operation of one only of said motors at a given time and to render the other motor inoperative at that time, and adjustable timing means for adjustably varying the period of operation of said raising and lowering mechanism independently of the period of operation of said conveyor.

14. In combination in an electroprocessing machine, a tank, a work carrier, said work carrier comprising a linkage means attached to work piece support means which is arranged to maintain said work piece support in successively parallel positions during movement of said work carrier, a conveyor for conveying said work carrier along said tank, a motor for operating said conveyor, raising and lowering mechanism for raising and lowering said work carrier at predetermined locations along said tank, a motor for operating said raising and lowering mechanism, an electrical circuit arranged to effect the operation of one only of said motors at a given time and to render the other motor inoperative at that time, and adjustable timing means for varying the period of operation of said raising and lowering motor independently of the period of operation of said conveyor operating motor.

15. In combination in an electroprocessing machine, a tank, a work carrier, said work carrier comprising a linkage means attached to work piece support means which is arranged to maintain said work piece support in successively parallel positions during movement of said work carrier, a conveyor for conveying said work carrier along said tank, a motor for operating said conveyor, raising and lowering mechanism for raising and lowering said work carrier at predetermined locations along said tank, a motor for operating said raising and lowering mechanism, means responsive to the arrival of said work carrier at a predetermined location along said tank for halting said conveyor operating motor, means for restarting said conveyor operating motor after the expiration of a predetermined period of time, and means responsive to the arrival of said work carrier at another predetermined location for halting said conveyor operating motor and means responsive to the halting of said conveyor motor for starting said raising and lowering motor to raise and lower said work carrier while maintaining said conveyor stationary.

16. In combination in an electroprocessing machine, a tank, a work carrier, a conveyor for conveying said work carrier along said tank, a lifter arm for raising and lowering said work carrier, a contact pad on said lifter arm for engaging said work carrier, and parallel link means pivotally attached to said contact pad and pivotally anchored remote from said contact pad to a stationary support for maintaining said contact pad in successively parallel positions during the operation of said lifter arm.

17. In combination in an electroprocessing machine, a tank, a work carrier, a conveyor for conveying said work carrier along said tank, a lifter arm for raising and lowering said work carrier, a contact pad on said lifter arm for engaging said work carrier, parallel link means pivotally attached to said contact pad and pivotally anchored remote from said contact pad to a stationary support for maintaining said contact pad in successively parallel positions during the operation of said lifter arm, and cam means for operating said lifter arm at predetermined intervals of time.

18. In combination in an electroprocessing machine, a tank, a work carrier, said carrier comprising a plurality of arms pivotally attached to a work piece rack supporting means and arranged to maintain said work piece rack supporting member in successively parallel positions during vertical and horizontal movement of said work carrier, a conveyor for conveying said work carrier along said tank, a motor for operating said conveyor, raising and lowering mechanism, a circuit for lowering said work carrier at predetermined locations along said tank, a motor for operating said raising and lowering mechanism, a circuit for deenergizing said conveyor motor at a predetermined location while energizing said raising and lowering motor at said location, and means responsive to the raising of said work carrier to a predetermined level to deenergize said lowering motor and reenergize said conveyor motor.

19. In combination in an electroprocessing machine, a tank, a work carrier, said carrier comprising a plurality of arms pivotally attached to a work piece rack supporting means and arranged to maintain said work piece rack supporting member in successively parallel positions during vertical and horizontal movement of said work carrier, a conveyor for conveying said work carrier along said tank, a motor for operating said conveyor, raising and lowering mechanism for raising and lowering said work carrier at predetermined locations along said tank, a motor for operating said raising and lowering mechanism, a circuit for deenergizing said conveyor motor at a predetermined location while energizing said raising and lowering motor at said location, means responsive to the raising of said work carrier to a predetermined level to deenergize said lowering motor and reenergize said conveyor motor, and means responsive to the conveying of said raised work carrier to a predetermined position to deenergize said conveyor motor and reenergize said raising and lowering motor to lower said work carrier.

20. In combination in an electroprocessing machine, a tank, a work carrier, said carrier comprising a plurality of arms pivotally attached to a work piece rack supporting means and arranged to maintain said work piece rack supporting member in successively parallel positions during vertical and horizontal movement of said work carrier, a conveyor for conveying said work carrier along said tank, a motor for operating said conveyor, raising and lowering mechanism for raising and lowering said work carrier at predetermined locations along said tank, a motor for operating said raising and lowering mechanism, a circuit for deenergizing said conveyor motor at a predetermined location while energizing said raising and lowering motor at said location, means responsive to the raising of said work carrier to a predetermined level to deenergize said lowering motor and reenergize said conveyor means, means responsive to the conveying of said raised work carrier to a predetermined position to deenergize said conveyor motor and reenergize said raising and lowering motor to lower said work carrier, and means responsive to the lowering of said work carrier to a predetermined level to deenergize said raising and lowering motor and reenergize said conveyor motor.

ALBERT H. HANNON.